(12) United States Patent
Lou et al.

(10) Patent No.: US 8,564,899 B2
(45) Date of Patent: Oct. 22, 2013

(54) DISK DRIVE DECREASING A SETTLE DELAY BASED ON SPEED THAT A SETTLE PARAMETER ADAPTS

(75) Inventors: Mingji Lou, Corona, CA (US); Xiuli Guo, Irvine, CA (US); Orhan Beker, Aliso Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 223 days.

(21) Appl. No.: 13/206,354

(22) Filed: Aug. 9, 2011

(65) Prior Publication Data

US 2013/0038962 A1 Feb. 14, 2013

(51) Int. Cl.
*G11B 5/596* (2006.01)

(52) U.S. Cl.
USPC ........................................ 360/78.06

(58) Field of Classification Search
None
See application file for complete search history.

(56) References Cited

U.S. PATENT DOCUMENTS

| | | | |
|---|---|---|---|
| 5,150,266 A | 9/1992 | Albert | |
| 5,726,959 A * | 3/1998 | Yu | 369/30.14 |
| 6,236,627 B1 * | 5/2001 | Verboom | 369/44.26 |
| 6,442,109 B1 * | 8/2002 | Iida | 369/30.14 |
| 6,658,535 B1 | 12/2003 | Megiddo et al. | |
| 6,738,218 B1 | 5/2004 | Hamada et al. | |
| 7,248,428 B2 | 7/2007 | Kim et al. | |
| 7,315,432 B2 | 1/2008 | Lee | |
| 7,324,296 B1 | 1/2008 | DeRosa | |
| 7,330,332 B2 | 2/2008 | Baek et al. | |
| 7,430,093 B2 | 9/2008 | Lee et al. | |
| 7,457,076 B2 | 11/2008 | Semba et al. | |
| 7,538,970 B2 | 5/2009 | Aoki et al. | |
| 2004/0153845 A1 * | 8/2004 | Nam | 714/42 |
| 2007/0217058 A1 * | 9/2007 | Asakura et al. | 360/77.08 |
| 2008/0002282 A1 * | 1/2008 | Lee | 360/77.04 |
| 2013/0038962 A1 * | 2/2013 | Lou et al. | 360/78.06 |

OTHER PUBLICATIONS

William Messner, Marc Bodson, "Design of Adaptive Feedforward Controllers Using Internal Model Equivalence", American Control Conference, Jun. 1994, pp. 1819 and 1620-1623.
Young-Hoon Kim, Chang-Ik Kang, Masayoshi Tomizuka, "Adaptive and Optimal Rejection of Non-Repeatable Disturbance in Hard Disk Drives", International Conference on Advanced Intelligent Mechatronics, Jul. 2005, pp. 1-6.
P. Ioannou, B. Fidan, "Adaptive Control Tutorial", 2006, pp. 40-41, Society for Industrial and Applied Mathematics, Philadelphia, PA USA.

* cited by examiner

*Primary Examiner* — Peter Vincent Agustin

(57) ABSTRACT

A disk drive is disclosed comprising a head actuated over a disk comprising a plurality of tracks, and control circuitry operable to seek the head to a target track and settle the head on the target track during a settle time, adapt a settle parameter used to settle the head on the target track, access the target track after an access delay, and decrease the access delay based on a speed that the settle parameter adapts.

16 Claims, 5 Drawing Sheets

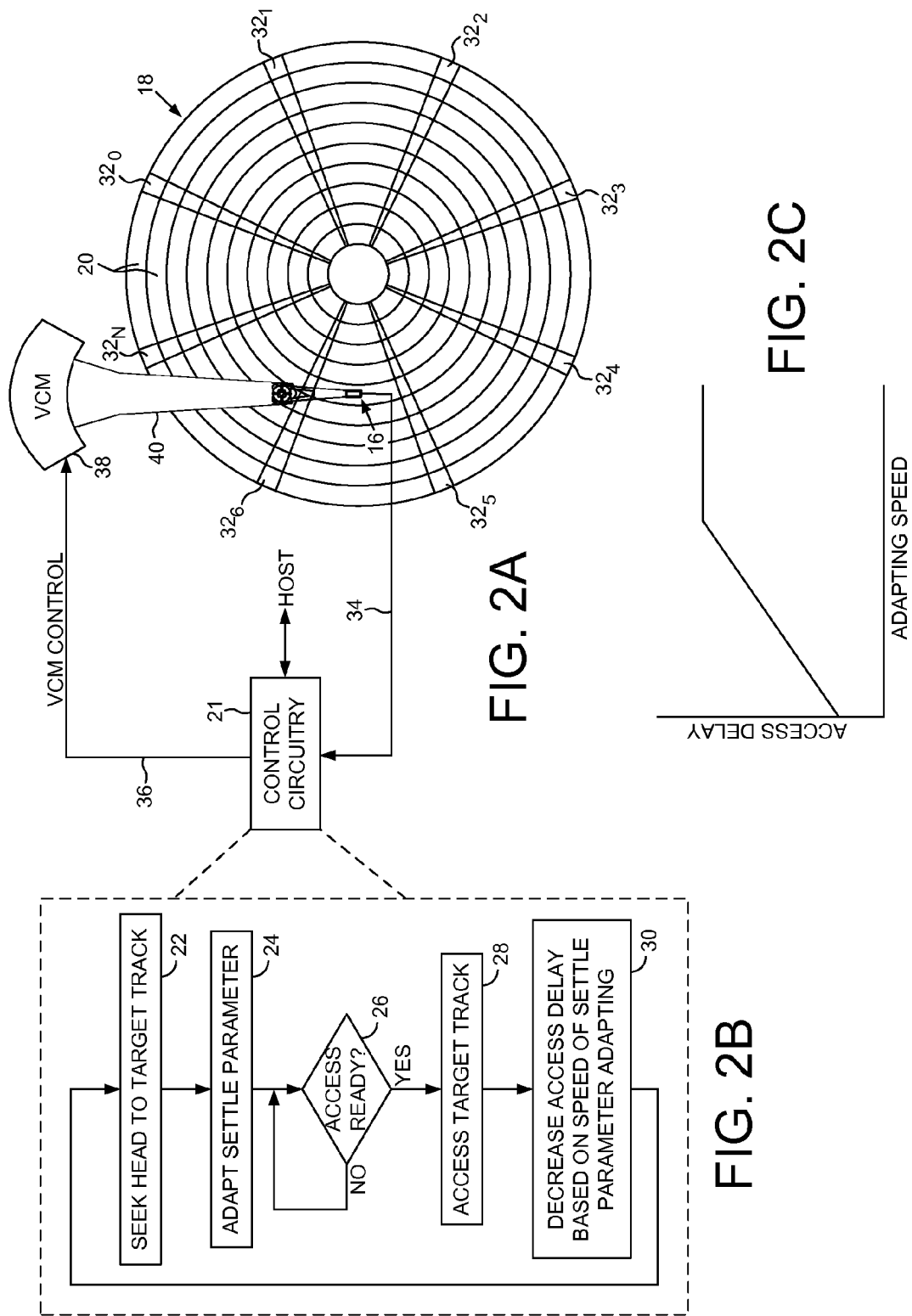

DISK DRIVE DECREASING A SETTLE DELAY BASED ON SPEED THAT A SETTLE PARAMETER ADAPTS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of servo tracks 4 that define the data tracks, wherein the data tracks are banded together to form a plurality of zones.

The prior art disk format of FIG. 1 also shows a number of servo sectors $6_0$-$6_N$ that define the servo tracks 4, wherein the data tracks are accessed relative to the servo tracks 4. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

BRIEF DESCRIPTION OF THE DRAWINGS

FIG. 2A shows a disk drive according to an embodiment of the present invention comprising a head actuated over a disk.

FIG. 2B is a flow diagram according to an embodiment of the present invention wherein after seeking to a target track a settle parameter is adapted and an access delay is decreased based on a speed of the settle parameter adapting.

FIG. 2C illustrates the access delay decreasing as the adapting speed of the settle parameter decreases according to an embodiment of the present invention.

DETAILED DESCRIPTION OF EMBODIMENTS OF THE INVENTION

FIG. 2A shows a disk drive according to an embodiment of the present invention comprising a head 16 actuated over a disk 18 comprising a plurality of tracks 20. The disk drive further comprises control circuitry 21 operable to seek the head to a target track and settle the head on the target track during a settle time (step 22), adapt a settle parameter used to settle the head on the target track (step 24), access the target track (step 28) after an access delay (step 26), decrease the access delay based on a speed that the settle parameter adapts (step 30), and repeat the flow diagram at least once starting at step 22.

Figure 1:
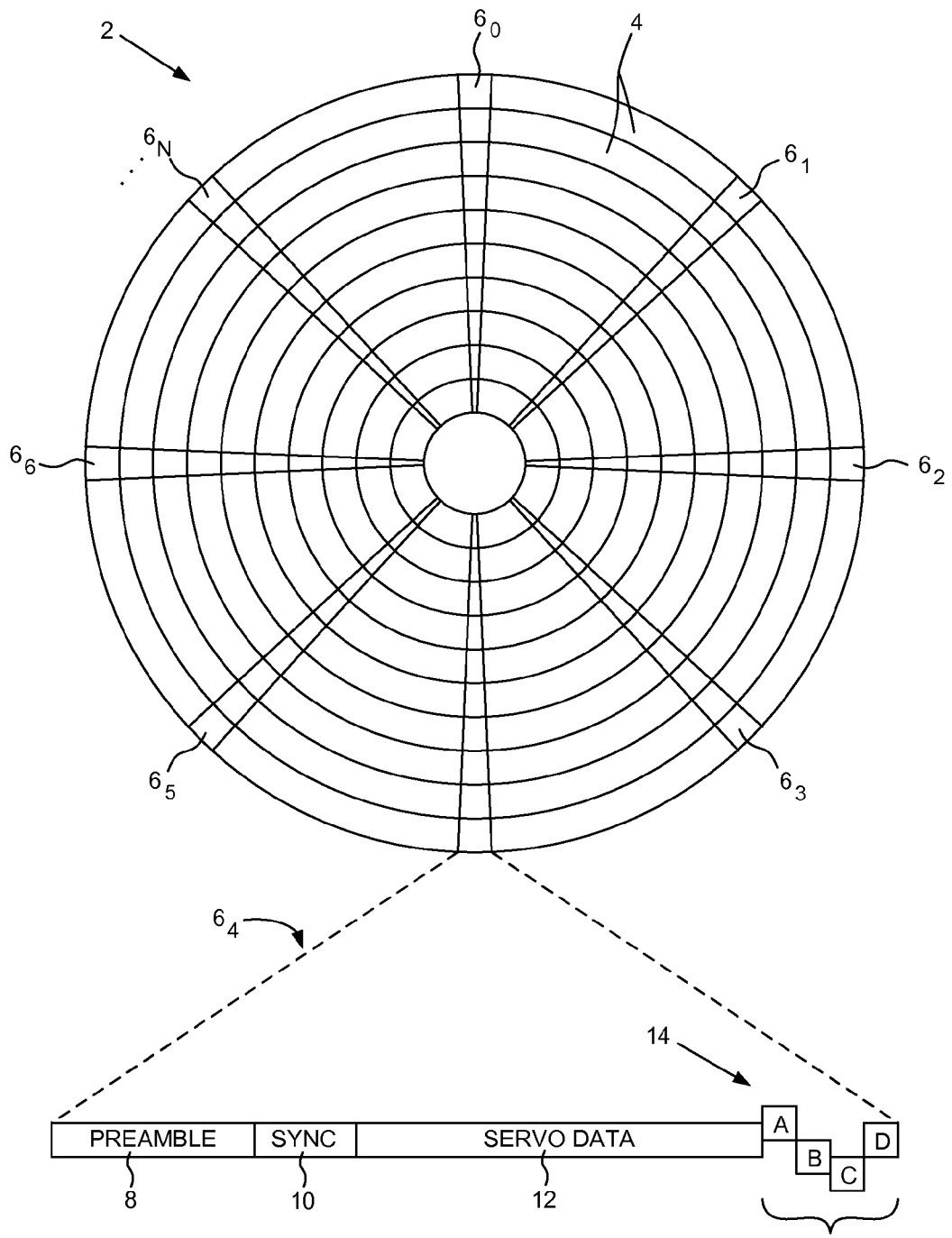
FIG. 1 shows a prior art disk format comprising a plurality of servo sectors that define a plurality of servo tracks.

In the embodiment of FIG. 2A, the disk 18 comprises embedded servo sectors $32_0$-$32_N$ that define a plurality of servo tracks 20. The control circuitry 21 processes a read signal 34 emanating from the head 16 to demodulate the servo sectors $32_0$-$32_N$ and generate a position error signal (PES) representing an error between the actual position of the head and a target position relative to a target track. The control circuitry 21 filters the PES using a suitable compensation filter to generate a control signal 36 applied to a voice coil motor (VCM) 38 which rotates an actuator arm 40 about a pivot in order to actuate the head 16 radially over the disk in a direction that reduces the PES. The servo sectors $32_0$-$32_N$ may comprise any suitable position information, such as a track address for coarse positioning and servo bursts for fine positioning. The servo bursts may comprise any suitable servo burst pattern, such as an amplitude based servo burst pattern (e.g., A,B,C,D quadrature pattern) shown in FIG. 1, or a phase based servo burst pattern (e.g., N,Q servo bursts).

In one embodiment, when the control circuitry 21 seeks the head 16 to a target track, one or more settle parameters are used to settle the head onto the target track during a settle interval. In an example described below, the settle parameters may comprise a magnitude of a sinusoid that estimates a repeatable runout (RRO) of the disk 18. The sinusoid may be used to generate feedforward compensation values so that the head follows the RRO while settling onto the target track (and while tracking the centerline of the target track). In one embodiment, it may take several seeks (e.g., a hundred seeks) for the settle parameters to converge. That is, during the settle interval of each initial seek the settle parameters are adapted, and after a number of seeks, the settle parameters converge toward optimal values. At the beginning of the learning seeks, the settle parameters are typically suboptimal, and therefore an access delay associated with accessing the track (write or read) is increased to allow more time for the head to settle onto the track, thereby avoiding off-track writes and or slipped revolutions. This is illustrated in FIG. 2C wherein the access delay is initialized to a high value at the beginning of the learning seeks. Then as the adapting speed of the settle parameters decreases (meaning that the settle parameters are converging), the access delay is decreased so that the track can be accessed sooner.

Figure 3A:
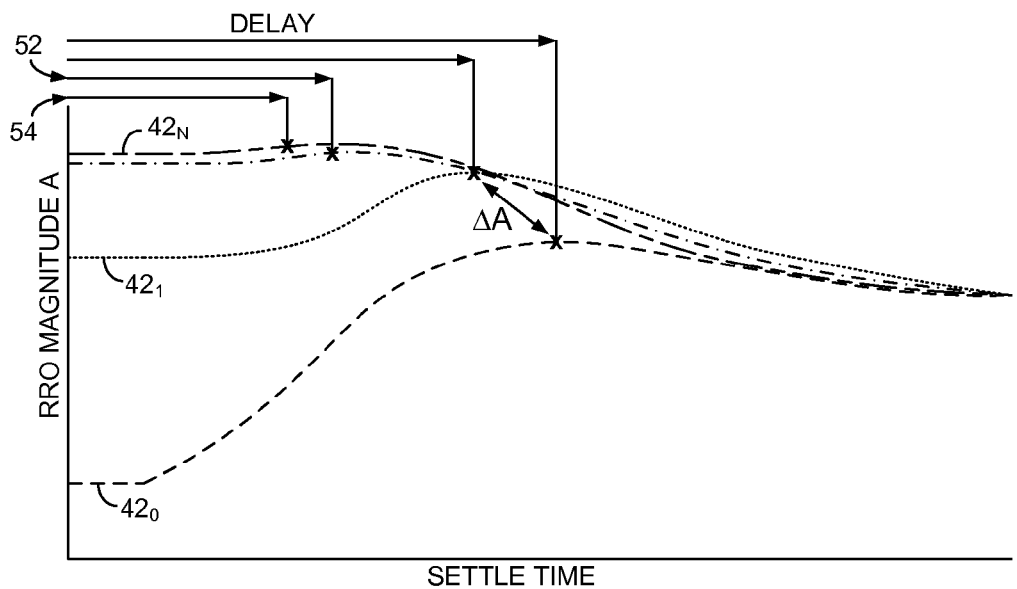
FIGS. 3A and 3B illustrate an embodiment of the present invention wherein the settle parameter comprises a magnitude of a sinusoid that estimates a repeatable runout (RRO) of the disk.
Figure 3B:
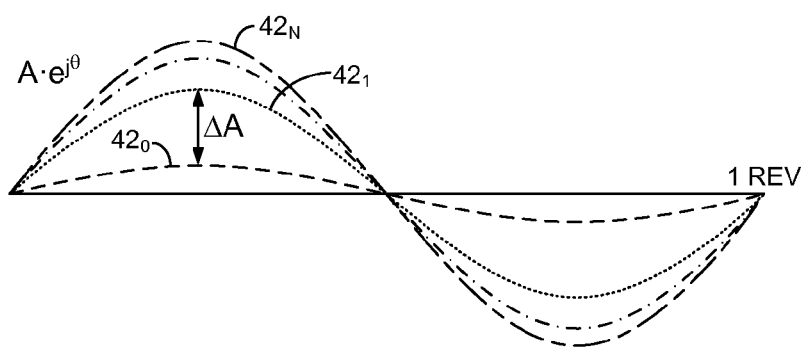

FIGS. 3A and 3B illustrate an embodiment of the present invention wherein the settle parameter comprises a magnitude A of a sinusoid ($Ae^{j\theta}$) that estimates a repeatable runout (RRO) of the disk, where $\theta$ represents the phase of the sinusoid having an angular frequency of $2\pi k/N$ (k is a current servo sector out of N servo sectors). During a first seek to a target track, the magnitude A adapts to a first value $42_0$ during an adapting delay which may be the same or different than the access delay. During the next seek to the target track, the magnitude A further adapts to a second value $42_1$ during the adapting delay. In one embodiment, the difference in the magnitude ΔA of the sinusoid at the end of the adapting delay represents the speed at which the settle parameter is adapting. That is, the control circuitry 21 measures the speed that the settle parameter adapts by measuring a difference between the settle parameter over an interval, wherein in one embodiment the interval corresponds to the adapting delay of consecutive seeks. In an alternative embodiment, the interval for measuring the difference in the settle parameter may span at least part of a single settle time for a single seek (e.g., beginning to end of the adapting delay). As illustrated in FIGS. 3A and 3B, the adapting speed of the settle parameter decreases as the number of seeks increases, with a corresponding decrease in the delay (access delay and/or adapting delay).

In one embodiment, the control circuitry 21 measures the speed that the settle parameter adapts according to:

$$\text{speed}[k]=(1-\alpha)\text{speed}[k-1]+\alpha(p[k]-p[k-1])$$

where k−1 and k represent a beginning and end of the interval, α is a scalar, and p is the settle parameter. The above equation operates to filter out outliers in the adapting speed measurements so that the access delay decreases without significant transients. However, the above equation is optional, or may be modified into any suitable filtering function.

Figure 4:
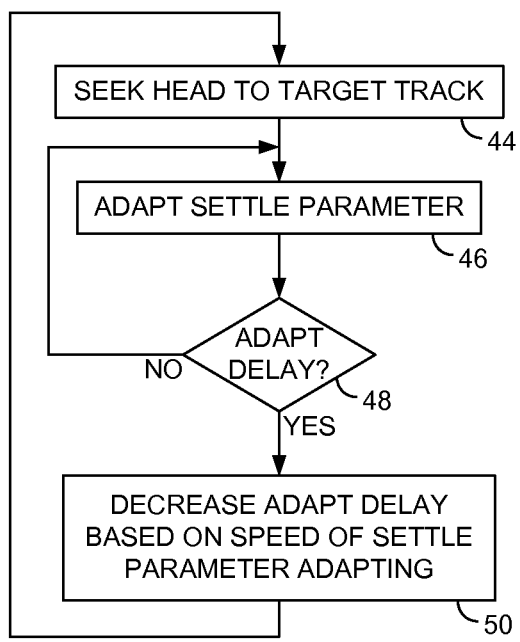
FIG. 4 is a flow diagram according to an embodiment of the present invention wherein an adapting delay is decreased based on the adapting speed of the settle parameter.

FIG. 4 is a flow diagram according to an embodiment of the present invention wherein the control circuitry is operable to seek the head to a target track and settle the head on the target track during a settle time (step 44), and adapt a settle parameter over an adapting delay of the settle time (step 46), wherein the settle parameter is used to settle the head on the target track. After the adapting delay (step 48), the adapting delay is decreased based on a speed that the settle parameter adapts (step 50), and the flow diagram is repeated at least once starting at step 44.

Referring again to the example of FIG. 3A, the adapting delay is initialized to a long value to allow the settle parameter to adapt longer at the beginning of the learning seeks. As the adapting speed decreases, the adapting delay decreases. In one embodiment, the adapting delay is decreased to account for changes in an adaptation profile of the settle parameter. In the example of FIG. 3A, the magnitude A of the RRO sinusoid rises to a peak during the settle interval, and then decreases as the head is tracking the target track. The time to the peak in the adaptation profile may decrease as the adapting speed of the settle parameter decreases as illustrated in FIG. 3A. Therefore, in one embodiment the adapting delay is initialized based on an expected peak in an adaptation profile of the settle parameter, and then decreased so as to substantially track the location of the peak in the adaptation profile. In one embodiment, the initial adapting delay and/or the initial access delay may span multiple revolutions of the disk whereas the final adapting delay and/or access delay may span a fraction of a revolution (e.g., a tenth of a revolution).

In one embodiment, the initial adapting delay may equal the initial access delay, but the final adapting delay may be greater than the final access delay. For example, in FIG. 3A the final adapting delay may be limited to delay 52 whereas the access delay may be decreased to delay 54. The shorter access delay allows the target track to be accessed sooner while allowing the settle parameter to continue adapting for a while longer (e.g., until the peak is reached in the adaptation profile as described above).

Figure 5:
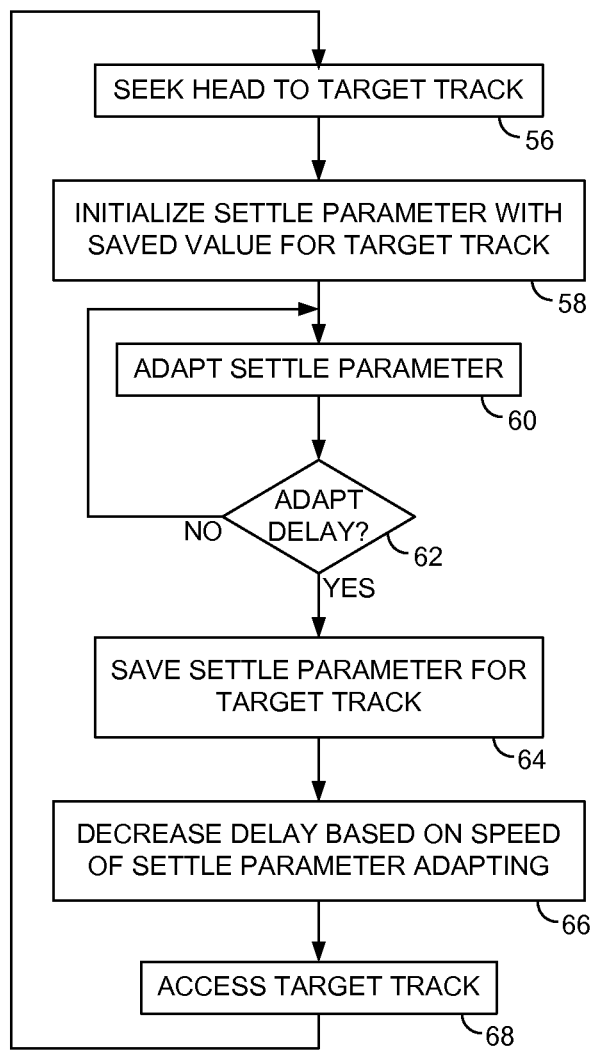
FIG. 5 is a flow diagram according to an embodiment of the present invention wherein the adapted settle parameter is saved after the adapting delay, and then used to initialize the settle parameter for the next seek to the same track.

FIG. 5 is a flow diagram according to an embodiment of the present invention wherein after seeking the head to a target track (step 56), the settle parameter is initialized at the beginning of the settle interval with a value saved from a previous seek (step 58). The settle parameter is then adapted for the current seek (step 60). When the adapting delay is reached during the settle interval (step 62), the adapted value of the settle parameter is saved (step 64), and at least one of the adapting delay and the access delay is decreased based on the adapting speed of the settle parameter (step 66). The target track is then accessed by performing a write or read operation (step 68). When another seek is performed to the same track (step 56), at the beginning of the settle interval the settle parameter is initialized (step 58) with the value saved at step 64.

In one embodiment, the settle parameter may continue adapting during the access operation, but is initialized with the value saved at the end of the adapting delay. As described above, initializing the settle parameter based on the end of the adapting delay of the previous seek operation may help track a peak in an adaptation profile of the settle parameter as illustrated in the example of FIG. 3A.

In one embodiment, the tracks of the disk may be banded together to define a plurality of zones, wherein a different value may be used for the settle parameters for each zone. That is, there may be multiple sets of settle parameters where each set corresponds to a zone, and each set may be adapted when the control circuitry seeks the head into the respective zone. In one embodiment, the control circuitry may adapt the settle parameters of a zone only when the seek length to reach the zone exceeds a threshold. That is, the settle parameters may exhibit a particular characteristic (such as the overshoot peak in FIG. 3A) when the seek to the zone exceeds a threshold. In one embodiment when the control circuitry executes a shorter seek, the settle parameters are not changed (i.e., the current value of the settle parameters are used after a short seek).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:
1. A disk drive comprising:
a disk comprising a plurality of tracks;
a head actuated over the disk; and
control circuitry operable to:

(a) seek the head to a target track and settle the head on the target track during a settle time;
(b) adapt a settle parameter used to settle the head on the target track;
(c) access the target track after an access delay;
(d) decrease the access delay based on a speed that the settle parameter adapts; and
(e) repeat (a) through (d) at least once.

2. The disk drive as recited in claim 1, wherein the control circuitry is further operable to measure the speed that the settle parameter adapts by measuring a difference between the settle parameter over an interval.

3. The disk drive as recited in claim 2, wherein the control circuitry is further operable to measure the speed that the settle parameter adapts according to:

$$speed[k]=(1-\alpha)speed[k-1]+\alpha(p[k]-p[k-1])$$

wherein:
k−1 and k present a beginning and end of the interval;
α is a scalar; and
p is the settle parameter.

4. The disk drive as recited in claim 2, wherein the interval spans at least part of a single settle time for a single seek.

5. The disk drive as recited in claim 4, wherein the interval spans at least part of multiple settle times for multiple seeks.

6. The disk drive as recited in claim 1, wherein the settle parameter comprises a magnitude of a sinusoid that estimates a repeatable runout (RRO) of the disk.

7. the disk drive as recited in claim 1, wherein the control circuitry is further operable to:
adapt the settle parameter over an adapting delay of the settle time;
save the settle parameter after the adapting delay of a first settle time of a first seek;
further adapt the saved settle parameter over the adapting delay of a second settle time of a second seek; and
decrease the adapting delay based on the speed that the settle parameter adapts.

8. The disk drive as recited in claim 7, wherein the adapting delay substantially equals the access delay.

9. A method of operating a disk drive comprising, the disk drive comprising a head actuated over a disk comprising a plurality of tracks, the method comprising:
(a) seeking the head to a target track and settle the head on the target track during a settle time;
(b) adapting a settle parameter used to settle the head on the target track;
(c) accessing the target track after an access delay;
(d) decreasing the access delay based on a speed that the settle parameter adapts; and
(e) repeating (a) through (d) at least once.

10. The method as recited in claim 9, further comprising measuring the speed that the settle parameter adapts by measuring a difference between the settle parameter over an interval.

11. The method as recited in claim 10, further comprising measuring the speed that the settle parameter adapts according to:

$$speed[k]=(1-\alpha)speed[k-1]+\alpha(p[k]-p[k-1])$$

wherein:
k−1 and k present a beginning and end of the interval;
α is a scalar; and
p is the settle parameter.

12. The method as recited in claim 10, wherein the interval spans at least part of a single settle time for a single seek.

13. The method as recited in claim 12, wherein the interval spans at least part of multiple settle times for multiple seeks.

14. The method as recited in claim 9, wherein the settle parameter comprises a magnitude of a sinusoid that estimates a repeatable runout (RRO) of the disk.

15. the method as recited in claim 9, further comprising:
adapting the settle parameter over an adapting delay of the settle time;
saving the settle parameter after the adapting delay of a first settle time of a first seek;
further adapting the saved settle parameter over the adapting delay of a second settle time of a second seek; and
decreasing the adapting delay based on the speed that the settle parameter adapts.

16. The method as recited in claim 15, wherein the adapting delay substantially equals the access delay.

* * * * *